(12) United States Patent
Stefanick et al.

(10) Patent No.: US 9,194,272 B2
(45) Date of Patent: Nov. 24, 2015

(54) POWER SYSTEM

(75) Inventors: Matthew Owen Stefanick, Peoria, IL (US); Brett Bailey, Peoria, IL (US); Christopher Joseph Rynders, Jr., Peoria Heights, IL (US); Clifford Eugene Cotton, III, Bradford, IL (US)

(73) Assignee: Caterpillar Inc., Peoria, IL (US)

( * ) Notice: Subject to any disclaimer, the term of this patent is extended or adjusted under 35 U.S.C. 154(b) by 1804 days.

(21) Appl. No.: 12/314,006

(22) Filed: Dec. 2, 2008

(65) Prior Publication Data

US 2010/0132341 A1 Jun. 3, 2010

(51) Int. Cl.
*F01N 3/00* (2006.01)
*F01N 9/00* (2006.01)
*F01N 3/029* (2006.01)

(52) U.S. Cl.
CPC .............. *F01N 9/002* (2013.01); *F01N 3/029* (2013.01); *F01N 3/0296* (2013.01); *F01N 2510/065* (2013.01); *F01N 2560/06* (2013.01); *F01N 2560/08* (2013.01); *F01N 2610/01* (2013.01); *F01N 2610/10* (2013.01); *F01N 2610/146* (2013.01); *Y02T 10/47* (2013.01); *Y10T 29/49826* (2015.01)

(58) Field of Classification Search
USPC ............................. 60/274, 284–287, 295–301
See application file for complete search history.

(56) References Cited

U.S. PATENT DOCUMENTS

| | | | | |
|---|---|---|---|---|
| 4,322,387 A * | 3/1982 | Virk et al. | | 422/174 |
| 4,462,208 A * | 7/1984 | Hicks et al. | | 60/286 |
| 4,502,278 A * | 3/1985 | Stark | | 60/303 |
| 4,576,617 A * | 3/1986 | Renevot | | 95/279 |
| 4,665,690 A * | 5/1987 | Nomoto et al. | | 60/286 |
| 4,946,609 A | 8/1990 | Pruess et al. | | |
| 5,344,467 A | 9/1994 | Huang et al. | | |
| 5,758,496 A * | 6/1998 | Rao et al. | | 60/295 |
| 6,003,303 A * | 12/1999 | Peter-Hoblyn et al. | | 60/274 |
| 6,051,040 A * | 4/2000 | Peter-Hoblyn | | 44/358 |
| 6,056,792 A * | 5/2000 | Barr et al. | | 44/403 |
| 6,248,689 B1 | 6/2001 | Manson | | |
| 6,488,725 B1 | 12/2002 | Vincent et al. | | |
| 6,666,020 B2 * | 12/2003 | Tonetti et al. | | 60/286 |
| 6,722,123 B2 * | 4/2004 | Liu et al. | | 60/286 |
| 6,892,531 B2 | 5/2005 | Rim | | |
| 6,971,337 B2 | 12/2005 | Guinther et al. | | |
| 7,073,327 B2 * | 7/2006 | Hashimoto et al. | | 60/297 |
| 7,137,246 B2 | 11/2006 | van Nieuwstadt et al. | | |
| 7,306,634 B2 | 12/2007 | Caprotti et al. | | |
| 7,328,572 B2 * | 2/2008 | McKinley et al. | | 60/286 |
| 7,367,182 B2 * | 5/2008 | Takahashi et al. | | 60/286 |
| 2003/0226312 A1 * | 12/2003 | Roos et al. | | 44/280 |

(Continued)

OTHER PUBLICATIONS

Material Safety Data Sheet, EnerBurn® M—EC5932A, EnerTeck Chemical Corp., Jul. 2003, pp. 1-9.

(Continued)

*Primary Examiner* — Jesse Bogue
(74) *Attorney, Agent, or Firm* — Finnegan, Henderson, Farabow, Garrett & Dunner, LLP

(57) ABSTRACT

The present disclose is directed to a power system. The power system may include a power source that creates a flow of exhaust. The power system may further include a particulate collection device that receives the flow of exhaust. The power system may also include an additive injector located downstream of the power source, the additive injector may be configured to provide a controlled supply of additive to the flow of exhaust.

20 Claims, 2 Drawing Sheets

(56) References Cited

U.S. PATENT DOCUMENTS

| | | |
|---|---|---|
| 2004/0231615 A1 | 11/2004 | Vincent et al. |
| 2005/0241299 A1 | 11/2005 | Brown |
| 2007/0068146 A1 | 3/2007 | Rolffs et al. |
| 2007/0068147 A1 | 3/2007 | Sun et al. |
| 2007/0283681 A1* | 12/2007 | Makkee et al. ............... 60/274 |
| 2007/0289289 A1 | 12/2007 | Kojima et al. |
| 2008/0022670 A1 | 1/2008 | Ichikawa |
| 2008/0098727 A1* | 5/2008 | Driscoll et al. ............... 60/286 |
| 2008/0141660 A1* | 6/2008 | Kim et al. ............... 60/286 |
| 2008/0141661 A1 | 6/2008 | Voss et al. |
| 2008/0148717 A1 | 6/2008 | Ohshima et al. |

OTHER PUBLICATIONS

"Mann + Hummel Installation Instructions SMF®—AR System Mini Hydraulic Excavator Caterpillar 303C CR," Mann + Hummel GmbH, Jun. 2007, pp. 1-20.

"Filters with Fuel Additives" posted at http://www.dieselnet.com/tech/dpf_add.html (available 2003).

\* cited by examiner

POWER SYSTEM

TECHNICAL FIELD

The present disclosure relates generally to a power system and, more particularly, to a power system having an additive injector located downstream of a power source to provide a controlled supply of additive to the flow of exhaust.

BACKGROUND

Internal combustion engines, including diesel engines, exhaust a complex mixture of potential air pollutants. These air pollutants may include solid material known as particulate matter or soot. Due to increased environmental concern, diesel engine exhaust emission standards have become increasingly stringent. The amount of particulate matter emitted from an engine may be regulated depending on the type of engine, size of engine, and/or class of engine.

One method implemented by engine manufacturers to comply with the regulation of particulate matter exhausted to the environment has been to remove the particulate matter from the exhaust flow of an engine using a device called a particulate trap or diesel particulate filter (DPF). A DPF is a filter designed to trap particulate matter in, for example, a wire mesh or ceramic honeycomb filtering media. Over time the particulate matter may accumulate in the filtering media, thereby reducing filter functionality and engine performance.

Various regeneration techniques may be employed to manage the accumulated particulate matter. For example, U.S. Pat. No. 6,488,725 ("the '725 patent") issued to Vincent et al. on Dec. 3, 2002, describes a method of supplying an iron-containing fuel soluble additive for use in the regeneration of a particulate filter trap. The method includes supplying an additive to the fuel prior to combustion. In particular, the supply of additive is added into the fuel supply chain or is added via a dosing device on-board the vehicle to either the fuel tank, combustion chamber, or the inlet system. The additive mixes with the fuel, and the mixture is combusted to provide a flow of exhaust containing soot particulates and additives. In operation, the additives reduce the soot particulate ignition temperature. In this manner, the additives reduce the energy input required to initiate regeneration of the particulate filter.

Although the method described in the '725 patent may suitably regenerate the particulate filter trap, it may be problematic. In particular, as the additives travel through the fuel injectors of the engine, the additives may build-up in the injector tip. This may reduce the volumetric efficiency and spray pattern of the injectors. Furthermore, the additives may form a sediment in the combustion chamber of the engine thereby negatively affecting engine performance.

The system of the present disclosure solves one or more of the shortcomings set forth above and/or other shortcomings in the art.

SUMMARY

One aspect of the present disclosure is directed to a power system. The power system may include a power source that creates a flow of exhaust. The power system may further include a particulate collection device that receives the flow of exhaust. The power system may also include an additive injector located downstream of the power source, the additive injector may be configured to provide a controlled supply of additive to the flow of exhaust.

Another aspect of the present disclosure is directed to a method of assisting regeneration of a particulate collection device that receives a flow of exhaust from an internal combustion engine. The method may include supplying an additive to the flow of exhaust from a location downstream of an exhaust manifold of the internal combustion engine. The method may further include regenerating the particulate collection device after the additive has been supplied to the particulate collection device.

DETAILED DESCRIPTION

Figure 1:
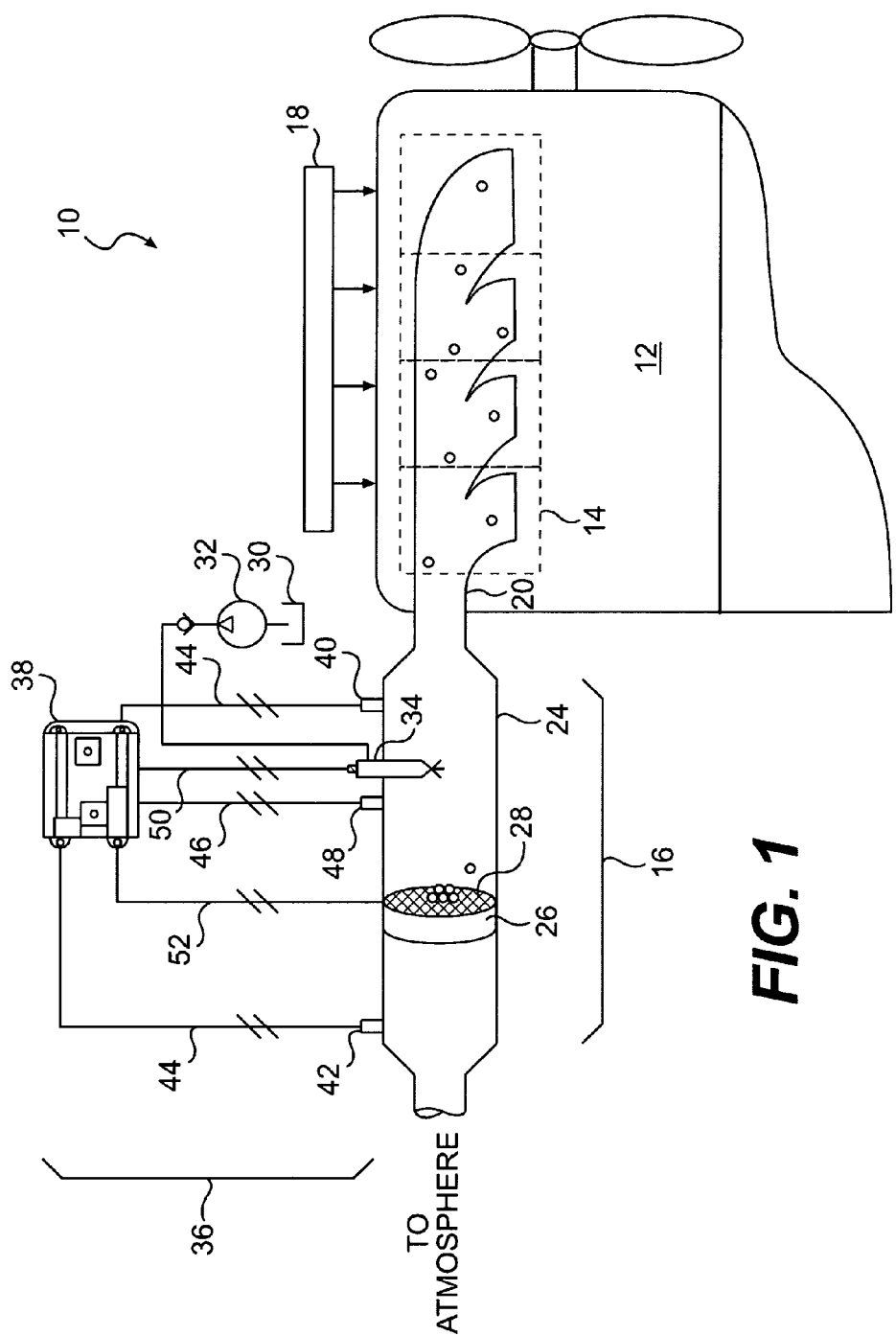
FIG. 1 is a schematic and diagrammatic illustration of an exemplary disclosed power system including an after-treatment system.

FIG. 1 illustrates a power system 10 including a power source 12 and an after-treatment system 16. In one embodiment, power system 10 may be associated with a mobile vehicle such as a passenger vehicle, a vocational vehicle, a farming machine, a mining machine, or a construction machine. Alternatively, power system 10 may be associated with a stationary machine such as, for example, a power generation machine.

For the purposes of this disclosure, power source 12 is depicted and described as a four-stroke diesel engine. One skilled in the art will recognize, however, that power source 12 may be any other type of internal combustion engine such as, for example, a gaseous fuel-power engine (e.g., a natural gas engine), or any other type of combustion engine known to one skilled in the art. Power source 12 may include an engine block that at least partially defines a plurality of combustion chambers 14. In the illustrated embodiment, power source 12 includes four combustion chambers. It is contemplated, however, that power source 12 may include a greater or lesser number of combustion chambers and that the combustion chambers may be disposed in an "in-line" configuration, or a "V" configuration, or any other suitable configuration.

Power source 12 may draw an air/fuel mixture into each combustion chamber 14 to produce a combustion of power, heat, and exhaust. In particular, power source 12 may include an intake manifold 18 to supply the air/fuel mixture to power source 12. Intake manifold 18 may receive fuel from a fuel supply (not shown) and air from an air supply (not shown). Power source 12 may further include an exhaust manifold 20 having exhaust passageways, each passageway being in fluid communication with one of combustion chambers 14 of power source 12. Exhaust manifold 20 may expel exhaust flow away from power source 12 towards after-treatment system 16 located downstream of power source 12.

After-treatment system 16 may reduce emissions of harmful gasses and particulate matter emitted from power source 12 after a combustion process. After-treatment system 16 may include a passageway 24, which may be in fluid communication with exhaust manifold 20 of power source 12. After-treatment system 16 may also include a particulate collection device 26 and a heating device 28. After-treatment system 16 may further include devices that provide a supply of additive solution to the flow of exhaust from power source 12 to facilitate regeneration of particulate collection device 26. Specifically, after-treatment system 16 may include an additive tank 30, a pump 32, an additive injector 34, and a control system 36. It is contemplated that after-treatment system 16 may include other components such as, for example, a selective catalytic reductant device, a NOx trap, and/or any other after-treatment system component known in the art.

Particulate collection device 26 may be disposed at least partially across the cylindrical width (i.e., cross-section) of passageway 24 and either removably or fixedly secured at its perimeter to passageway 24. Particulate collection device 26 may be any variety of diesel particulate filter ("DPF") such as, for example, a sintered metal fiber flow-through filter, cordierite or silicon carbide wall-flow filter, partial filter, or any other DPF known in the art. Particulate collection device 26 may be configured to trap particulate matter within a wire mesh or ceramic honeycomb filtration medium. As the flow of the exhaust passes through the filtration medium, particulate matter, for example, unburned hydrocarbons, may impinge against and be blocked by the filtration medium. Over time, the particulate matter may build up within particulate collection device 26 and the filtration medium may become saturated. If unaccounted for, this build up of particulate matter could reduce the flow of exhaust through the filtration medium and negatively effect engine performance.

Heating device 28 may be associated with particulate collection device 26 to selectively promote regeneration of particulate collection device 26. For example, heating device 28 may be integrated with or adjacent to particulate collection device 26. Heating device 28 may embody, for example, an electric grid. It is contemplated that heating device 28 may alternatively embody a fuel-fired burner or a fuel control strategy that selectively heats the flow of exhaust, if desired.

Additive tank 30 may constitute a reservoir configured to hold a supply of additive. Additive tank 30 may store diesel fuel and additive in an amount in the range of from about 1% to 50% by weight of the diesel fuel additive mixture. It is contemplated, that the additive may be alternatively stored in a lower boiling point hydrocarbon. The additive may include, for example, iron, barium, calcium, cerium, manganese, platinum, and/or any other transition metal configured to catalyze the oxidation of particulate matter.

Pump 32 may direct the supply of additive from additive tank 30 to additive injector 34. Pump 32 may be any kind of high-precision, metered, low-flow rate pump. Pump 32 may be a diaphragm pump or any other pump known to one skilled in the art.

Additive injector 34 may be any appropriate type of fluid injector configured to inject an amount of additive into passageway 24 of after-treatment system 16. As illustrated in FIG. 1, additive injector 34 may be located downstream of power source 12 and upstream of particulate collection device 26. In particular, additive injector 34 may be mounted at any point along the length of passageway 24 between exhaust manifold 20 of power source 12 and particulate collection device 26 given that the supply of additive delivered to the flow of exhaust does not enter combustion chamber 14 of power source 12. Additive injector 34 may be mounted to passageway 24 such that the nozzle of the injector is in fluid communication with the flow of exhaust therein. It is contemplated that additive injector 34 may be mechanically, hydraulically, or electrically actuated.

Control system 36 may be associated with after-treatment system 16 and may include components configured to regulate the operation of additive injector 34 in order to facilitate regeneration of particulate collection device 26. In particular, control system 36 may include a particulate collection device load sensor device including a first pressure sensor 40 and a second pressure sensor 42 configured to generate signals indicative of the load on the particulate collection device 26; a temperature sensor 48 configured to generate a signal indicative of the temperature of the flow of exhaust; and a controller 38 in communication with first pressure sensor 40, second pressure sensor 42, and temperature sensor 48. Controller 38 may be configured to regulate the operation of additive injector 34 in response to input received from first pressure sensor 40, second pressure sensor 42, and temperature sensor 48. Controller 38 may be additionally configured to control the operation of heating device 28.

First pressure sensor 40 and second pressure sensor 42 may be associated with passageway 24 of after-treatment system 16 and in communication with controller 38 via communication lines 44. In particular, first pressure sensor 40 may be operable to generate a signal indicative of a pressure of the flow of exhaust at or upstream of particulate collection device 26 but downstream of power source 12. Second pressure sensor 42 may be operable to generate a signal indicative of a pressure of the flow of exhaust downstream of particulate collection device 26. First and second pressure sensors 40, 42 may be capable of detecting a pressure differential across particulate collection device 26, wherein the pressure differential may be indicative of the amount of particulate matter contained within particulate collection device 26. It is contemplated that first and second pressure sensors 40, 42 may alternatively and/or additionally be any type of sensor capable of directly detecting the quantity of particulate matter within particulate collection device 26. For example, it is contemplated that the particulate matter load sensing device may be a single sensor such as, for example, a mass sensor.

Temperature sensor 48 may be associated with passageway 24 of after-treatment system 16 upstream from particulate collection device 26 and in communication with controller 38 via communication line 46. Specifically, temperature sensor 48 may be mounted to passageway 24 such that the temperature sensor 48 may measure a temperature of the exhaust flow therein. Alternatively, temperature sensor 48 may measure a temperature of particulate collection device 26 and/or a temperature of the captured particulates. That is, temperature sensor 48 may be thermally coupled with the particulate collection device 26 so as to determine its temperature. Temperature sensor 48 may also be located downstream of particulate collection device 26, if desired. Temperature sensor 48 may be operable to generate a signal indicative of the temperature of exhaust flow and/or particulate matter trapped within particulate collection device 26.

Additionally and/or alternatively, the temperature of the flow of exhaust and/or the pressure differential across particulate collection device 26 may be estimated by controller 38 rather than measured by sensors 40, 42, and 48. That is, controller 38 may determine the temperature and pressure difference across particulate collection device 26 as a function of variables related to one or more known operating conditions of power source 12 and/or the machine associated therewith (i.e., virtual sensors). For example, one or more engine performance maps relating a fueling amount, ignition timing, power output, engine speed, boost pressure, engine temperature, an air/fuel ratio, and/or other known parameters may be stored within the memory of controller 38. Each of these maps may be in the form of tables graphs and/or equations and include a compilation of data collected from lab and/or field operation of power source 12. Controller 38 may receive data relating to the operation of the power system 10 and may reference one or more of these maps in order to estimate a temperature associated with particulate collection device 26 and/or pressure difference across particulate collection device 26 for a given operating condition of power source 12. In this manner, controller 38 may measure or estimate pressure and/or temperature data from which decisions about additive injection may be made.

Controller 38 may embody a single microprocessor or multiple microprocessors that may control the operation of after-treatment system 16. Numerous commercially available microprocessors can be configured to perform the functions of controller 38. It should be appreciated that controller 38 could readily embody a general machine microprocessor capable of controlling numerous machine functions, an engine microprocessor, or a transmission microprocessor. Controller 38 may include a memory, a secondary storage device, a processor, software, and any other components for running an application. Various other circuits may be associated with controller 38, such as power supply circuitry, signal conditioning circuitry, solenoid driver circuitry, and other types of circuitry.

Controller 38 may regulate the supply of additive delivered by additive injector 34 to passageway 24 in order to facilitate regeneration of particulate collection device 26. Controller 38 may regulate the amount of additive by sending a command signal via communication line 50 to an actuator such as, for example, a solenoid actuator of additive injector 34. When active regeneration is required, controller 38 may send a command signal via communication line 52 to heating device 28 to heat particulate collection device 26.

Figure 2:
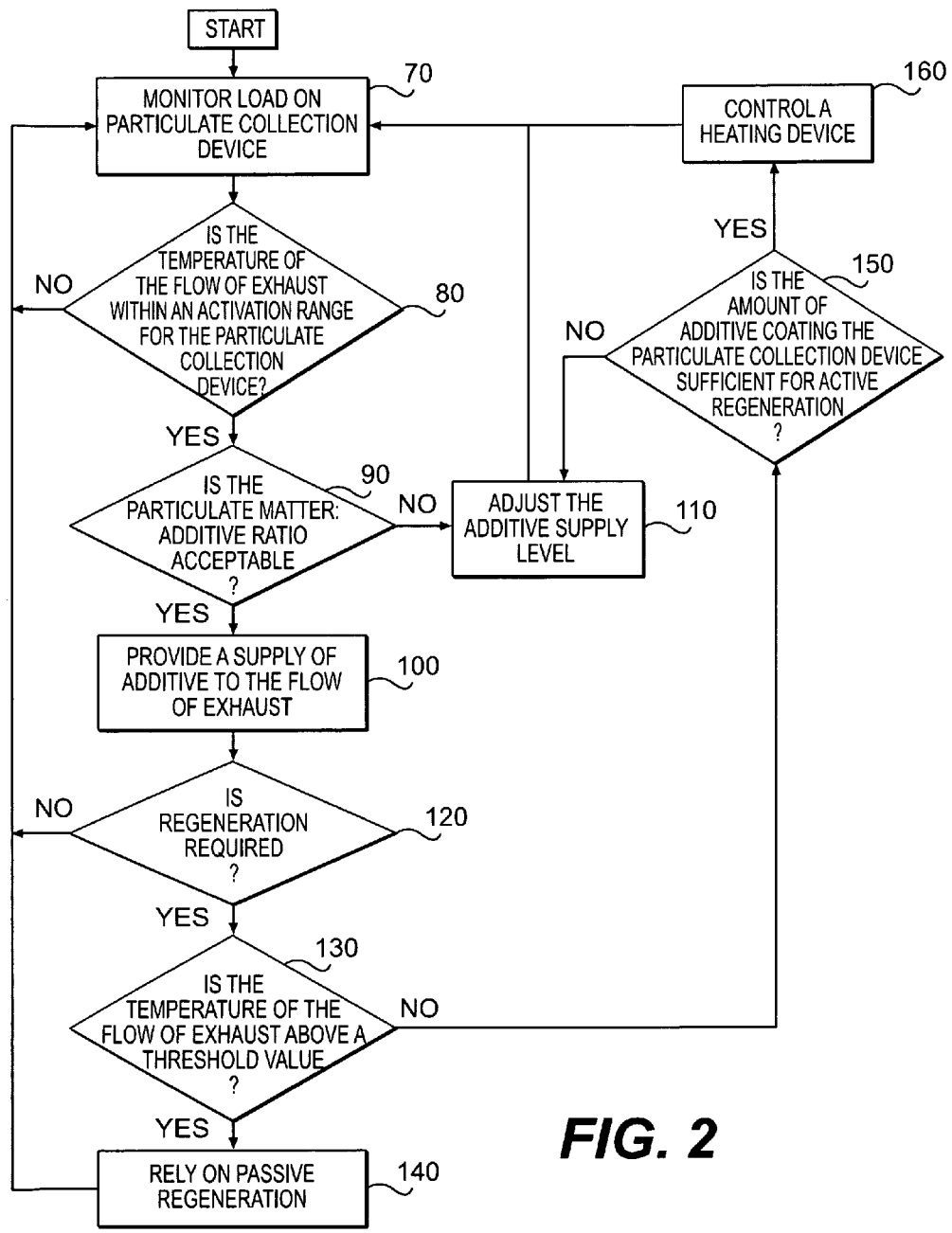
FIG. 2 is a flowchart depicting an exemplary disclosed operation of the after-treatment system of FIG. 1.

FIG. 2 illustrates an exemplary method according to one embodiment of the present disclosure. FIG. 2 will be discussed in more detail in the following section to further illustrate the disclosed system.

INDUSTRIAL APPLICABILITY

The disclosed system may be applicable to any power system having an after-treatment system that provides for regeneration of a particulate collection device. For example, the disclosed after-treatment system 16 may be applicable to mobile systems, such as engines that power mobile vehicles (e.g., automobiles, semi-trailer trucks, construction equipment, marine vessels, etc.). The after-treatment system 16 may also be applicable to stationary machines, such as electric power generation sets. The operation of power source 12 and after-treatment system 16 will now be explained.

Referring to FIG. 1, power source 12 may receive an air/fuel mixture from intake manifold 18, combust the mixture in combustion chambers 14, and output a flow of exhaust through exhaust manifold 20 of power source 12 to after-treatment system 16. The flow of exhaust may contain a complex mixture of air pollutants, which can include particulate matter such as soot. The release of particulate matter into the environment may be minimized by passing the flow of exhaust through particulate collection device 26 of after-treatment system 16. As this particulate matter laden flow of exhaust is directed from power source 12 through particulate collection device 26, particulate matter may build up in the device 26 thereby adversely affecting engine performance.

In order to facilitate regeneration of the particulate collection device 26, a supply of additive may be delivered from additive injector 34 to passageway 24 of after-treatment system 16 downstream of power source 12 and upstream of particulate collection device 26. The supply of additive may include, for example, iron, platinum, copper, cerium, manganese, barium, calcium, and/or any other transition metal configured to catalyze the oxidation of particulate matter. In passageway 24, these metal-based fuel additives may mix with the flow of exhaust and flow downstream to particulate collection device 26 where the additives may coat portions of the particulate collection device 26. At particulate collection device 26, the additives may undergo a chemical reaction which may catalyze soot oxidation. That is, the oxidizing metals of the metal-based fuel additives may lower the combustion threshold temperature of the soot thereby facilitating regeneration of the particulate collection device 26.

Turning now to FIG. 2, during operation of power system 10, controller 38 may monitor the load within particulate collection device 26 by the load sensing device of first and second sensors 40, 42 (step 70). While monitoring the load, controller 38 may additionally monitor the temperature of the flow of exhaust exiting power system 10 by temperature sensor 48.

When the temperature of the flow of exhaust is within the activation range (e.g., 200° C.-500° C.) of particulate collection device 26 (Step 80), controller 38 may calculate the ratio of particulate matter within particulate collection device 26 to additive coated on particulate collection device 26. Controller 38 may derive the amount of additive coated on particulate collection device 26 based on the number of previous additive injections. Controller 38 may reference one or more maps to determine if the particulate matter-to-additive ratio is acceptable (i.e., sufficient to facilitate regeneration of particulate collection device 26) (Step 90). When the ratio is acceptable, controller 38 may send a command signal, via communication line 50, to additive injector 34 instructing additive injector 34 to provide a supply of additive to the flow of exhaust in passageway 24 of after-treatment system 16 (Step 100) so as to maintain the particulate matter-to-additive ratio. When the ratio is not acceptable, controller 38 may reference one or more maps to determine the appropriate amount of additive to supply to the flow of exhaust. Controller 38 may send a command signal to additive injector 34 to adjust the supply of additive accordingly (Step 110).

While supplying additive to the flow of exhaust, controller 38 may continue to monitor the load on particulate collection device 26 and determine if regeneration is required (Step 120). In particular, controller 38 may reference one or more stored maps to determine when the amount of particulate matter within particulate collection device 26 is above or below a particulate matter load threshold value. When controller 38 determines that the amount of particulate matter is above a particulate matter load threshold value, controller 38 may classify that particulate collection device 26 is in need of regeneration. In contrast, when the amount of particulate matter within particulate collection device 26 is below a particulate matter load threshold value, controller 38 may classify that particulate collection device 26 is not in need of regeneration. It is contemplated that the particulate matter load threshold value may vary dependent on characteristics of power source 12 and after-treatment system 16. For example, the particulate matter load threshold value may vary dependent on engine size, power level, or any other characteristic that may affect the need to regenerate particulate collection device 26.

When particulate collection device 26 is in need of regeneration, controller 38 may reference one or more maps to determine if the flow of exhaust is above the first threshold value (e.g., 200° C.) (Step 130). If the temperature of the flow of exhaust is above the first threshold value, then passive regeneration may be sufficient to regenerate particulate collection device 26 (Step 140). In contrast, if the temperature of the flow of exhaust is not above the first threshold value, active regeneration may be required. Controller 38 may then determine if the amount of additive coating the particulate collection 26 device is sufficient for active regeneration (Step 150). When the amount of additive is sufficient, controller 38 may control heating device 28 (Step 160) to burn away the collected particulate matter. If, however, the amount of additive is insufficient for a complete burn, controller 38 may reference one or more maps to determine the appropriate amount of additive, and may send a command signal to additive injector 34 to adjust the supply of additive accordingly (Step 110).

Based on the above-disclosed system, the location of the disclosed additive injector 34 may help ensure that the additive does not enter the combustion chamber 14 of power source 12. In this manner, the disclosed additive injector 34 may avoid problems associated with the supply of additives travelling through power source 12. In addition, because the supply of additive is delivered into the flow of exhaust as a function of the load on particulate collection device 26 and the temperature of the flow of exhaust, controller 38 may regulate the timing and amount of additive supplied to the particulate collection device 26.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A power system, comprising:
   a power source that creates a flow of exhaust;
   a particulate collection device configured to collect particulate matter from the flow of exhaust; and
   an additive injector located downstream of the power source, the additive injector configured to provide an additive to the flow of exhaust, the additive being a metal-based catalyst configured to lower a combustion temperature of the particulate matter collected in the particulate collection device; and
   a control system configured to control a quantity of the additive provided to the exhaust based on an amount of particulate matter collected in the particulate collection device and a temperature of the exhaust.

2. The power system of claim 1, wherein the additive injector is coupled to a passageway which houses the particulate collection device, and wherein the additive injector is located upstream of the particulate collection device.

3. The power system of claim 2, wherein the additive injector is located downstream of an exhaust manifold of the power source.

4. The power system of claim 1, further including:
   an additive tank; and
   a pump configured to draw the additive from the additive tank and direct the additive to the additive injector.

5. The power system of claim 1, wherein the metal-based additive is an iron additive.

6. The power system of claim 1, wherein the control system is further configured to determine a ratio of the particulate matter within the particulate collection device to the additive coated on the particulate collection device.

7. The power system of claim 6, wherein the control system is configured to adjust the quantity of the additive provided to the exhaust to maintain the ratio within a desired level.

8. A method of assisting regeneration of a particulate collection device that receives a flow of exhaust from an internal combustion engine, comprising:
   determining an amount of particulate matter collected in the particulate collection device;
   determining a temperature of the flow of exhaust;
   supplying a quantity of an additive to the flow of exhaust to lower a combustion temperature of the particulate matter collected in the particulate collection device, the additive being supplied from a location downstream of an exhaust manifold of the internal combustion engine, and the quantity of the additive supplied being based on the determined amount of particulate matter and the determined temperature; and
   regenerating the particulate collection device after the additive has been supplied to the flow of exhaust.

9. The method of claim 8, further including controlling a heating device as a function of an amount of the additive coating the particulate collection device.

10. The method of claim 8, further including controlling a heating device when the additive is supplied to the flow of exhaust.

11. The method of claim 8, wherein supplying the additive to the flow of exhaust includes supplying an additive having at least one of platinum, copper, cerium, manganese, or iron.

12. The method of claim 11, further including at least partially coating the particulate collection device with the additive to oxidize trapped particulate matter in the particulate collection device.

13. The method of claim 8, further including determining a ratio of the particulate matter collected in the particulate collection device to the additive coated on the particulate collection device.

14. A power system, comprising:
   a power source that creates a flow of exhaust including particulate matter;
   a particulate collection device that receives the flow of exhaust and collects the particulate matter;
   an additive injector located downstream of the power source and upstream of the particulate collection device, the additive injector being configured to direct a catalyst additive to the flow of exhaust;
   at least one sensor configured to sense a parameter of the flow of exhaust and generate a signal indicative of a temperature of the exhaust; and
   a controller in communication with the additive injector and the at least one sensor, the controller being configured to control a quantity of the additive directed to the flow of exhaust based on an amount of particulate matter collected in the particulate collection device and a temperature of the exhaust.

15. The power system of claim 14, wherein the additive includes a metal-based additive.

16. The power system of claim 14, wherein the additive injector is located downstream of an exhaust manifold associated with the power source.

17. The power system of claim 14, wherein the controller is configured to determine a ratio of the particulate matter within the particulate collection device to the additive coated on the particulate collection device.

18. A method of assembling an additive injector to an after-treatment system of a power system including a particulate filter configured to collect particulate matter from exhaust flowing therethrough, comprising:
   coupling the additive injector to a supply of metal based catalyst additive;
   coupling the additive injector to a passageway of the after-treatment system, the additive injector being configured to direct the additive to the exhaust flowing through the passageway; and
   connecting the additive injector to a controller associated with the power system, wherein the controller is configured to control a quantity of the additive directed through the additive injector based on an amount of particulate matter collected in the particulate filter and a current exhaust temperature.

19. The method of claim 18, further including coupling a sensor configured to measure the current exhaust temperature to the controller, the controller being configured to activate a regeneration of the particulate filter.

20. The method of claim 19, wherein the controller is further configured to direct a sufficient quantity of the additive through the additive injector to lower a combustion temperature of the particulate matter collected in the particulate filter to the current temperature.

* * * * *